United States Patent
Cherubini et al.

(10) Patent No.: US 9,590,711 B2
(45) Date of Patent: Mar. 7, 2017

(54) MANAGING BEAMFORMED SIGNALS TO OPTIMIZE TRANSMISSION RATES OF SENSOR ARRAYS

(71) Applicant: International Business Machines Corporation, Armonk, NY (US)

(72) Inventors: Giovanni Cherubini, Rueschlikon (CH); Paul T. Hurley, Oberrieden (CH); Orhan Ocal, Berkeley, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/708,643

(22) Filed: May 11, 2015

(65) Prior Publication Data
US 2016/0337020 A1    Nov. 17, 2016

(51) Int. Cl.
H04K 1/02 (2006.01)
H04B 7/06 (2006.01)
H04B 7/02 (2006.01)

(52) U.S. Cl.
CPC .......... H04B 7/0617 (2013.01); H04B 7/024 (2013.01); H04B 7/0632 (2013.01)

(58) Field of Classification Search
CPC .... H04B 7/024; H04B 7/0413; H04B 7/0617; H04B 7/0632
See application file for complete search history.

(56) References Cited

U.S. PATENT DOCUMENTS

| | | | |
|---|---|---|---|
| 7,339,979 B1 | 3/2008 | Kelkar | |
| 8,761,477 B2 | 6/2014 | Walker et al. | |
| 2009/0009414 A1* | 1/2009 | Reykowski | G01R 33/3415 343/742 |
| 2010/0015923 A1* | 1/2010 | Golitschek | H04L 1/0026 455/67.7 |
| 2013/0257655 A1 | 10/2013 | Hu et al. | |
| 2013/0278260 A1 | 10/2013 | Gopinath et al. | |
| 2013/0335270 A1 | 12/2013 | Edelmann et al. | |
| 2015/0156780 A1* | 6/2015 | Kim | H04L 5/0035 370/331 |
| 2016/0029350 A1* | 1/2016 | Kishiyama | H04W 16/28 370/329 |

FOREIGN PATENT DOCUMENTS

CN 101609150 B 9/2011

OTHER PUBLICATIONS

Mohammadzadeh et al., "A Low-Complexity Adaptive Beamformer for Ultrasound Imaging Using Structured Covariance Matrix", IEEE Transactions on Ultrasonics, Ferroelectrics, and Frequency Control, vol. 59, No. 4, April 2012, pp. 660-667.

* cited by examiner

*Primary Examiner* — Janice Tieu
(74) *Attorney, Agent, or Firm* — David B. Woycechowsky

(57) ABSTRACT

Technology for managing beamformed signals. A method includes: receiving beamformed signals from one or more arrays of receiving elements, which one or more arrays of receiving elements send beamformed signals at given transmission rates; recovering information from the received beamformed signals; measuring a quality of the recovered information, using a metric that estimates a distance between the recovered information and reference information; and, based on the measured quality, instructing the one or more arrays of receiving elements to change the transmission rates at which they send beamformed signals.

9 Claims, 7 Drawing Sheets

MANAGING BEAMFORMED SIGNALS TO OPTIMIZE TRANSMISSION RATES OF SENSOR ARRAYS

BACKGROUND

Embodiments of the invention relate in general to the field of beamforming and methods for managing beamformed signals.

Modern large-scale radio telescope arrays use antenna stations composed of multiple antennas that are placed closely for imaging the sky. The signals received by the antennas at a station are typically combined by beamforming to reduce the amount of data to be processed in later stages. The signals sent out from the stations are then correlated to obtain visibilities, which correspond to samples of a Fourier transform of the sky image. The goal is then to reconstruct the sky image from the visibility measurements. Currently, beamforming at antenna stations is typically done by conjugate matched beamforming towards the center of the field of view at all antenna stations. Because the beam-shapes created at the stations are essentially the same and any differences are only due to the rotation of the stations with respect to each other, the information received by the antenna stations is merely coded in the phase of the signal because all of the stations scale the signal coming from a particular direction equally.

SUMMARY

According to an aspect of the present invention, there is a method for managing beamformed signals that performs the following operations (not necessarily in the following order): (i) receiving beamformed signals from one or more arrays of receiving elements, which one or more arrays of receiving elements send beamformed signals at given transmission rates; (ii) recovering information from the received beamformed signals; (iii) measuring a quality of the recovered information, using a metric that estimates a distance between the recovered information and reference information; and (iv) based on the measured quality, instructing the one or more arrays of receiving elements to change the transmission rates at which the one or more arrays of receiving elements send beamformed signals.

According to a further aspect of the present invention, a system for managing beamformed signals, includes: (i) a recovery unit, adapted for recovering information from beamformed signals received from one or more arrays of receiving elements at given transmission rates; and (ii) a processing unit adapted for: (a) measuring a quality of a recovered information, using a metric that estimates a distance between the recovered information and a reference information, and (b) instructing the one or more arrays of receiving elements to change the transmission rates at which they send beamformed signals, based on a quality of a recovered information as measured by the processing unit.

According to a further aspect of the present invention, a computer program product for managing beamformed signals includes a computer readable storage medium having program instructions embodied therewith. The program instructions are executable by a computerized system to cause: (i) a recovery unit of a system to recover information from beamformed signals received from one or more arrays of receiving elements at given transmission rates; and (ii) a processing unit to: (a) measure a quality of a recovered information, using a metric that estimates a distance between the recovered information and a reference information; and (b) instruct the one or more arrays of receiving elements to change the transmission rates at which they send beamformed signals, based on a quality of a recovered information as measured by the processing unit.

BRIEF DESCRIPTION OF THE DRAWINGS

Similar or functionally similar elements in the figures have been allocated the same reference signs if not otherwise indicated.

DETAILED DESCRIPTION

Figure 1:
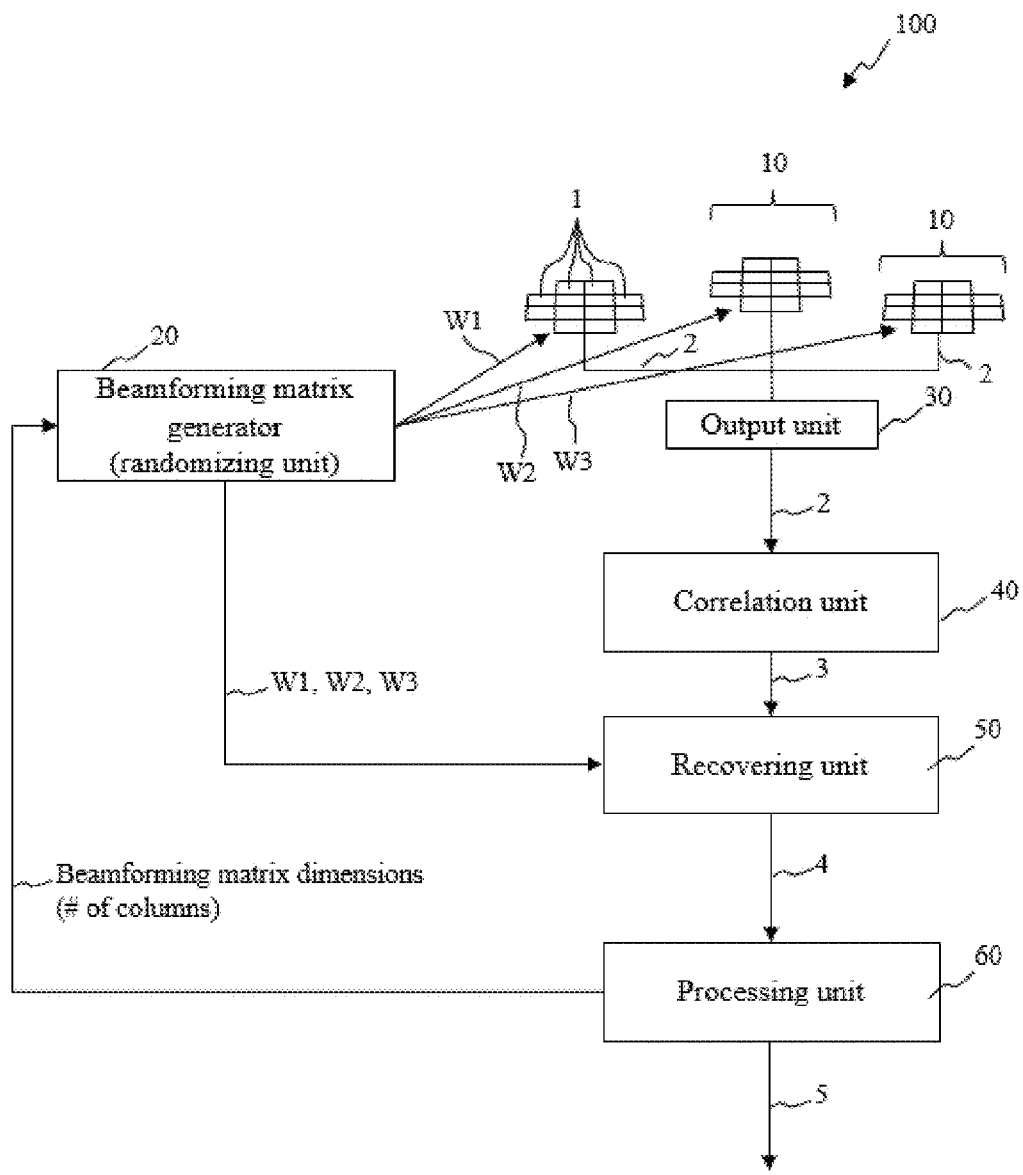
FIG. 1 illustrates an embodiment of a device for managing beamformed signals received from a plurality of receiving arrays.

Some embodiments of the present disclosure recognize that a problem with large-scale radio telescope arrays is the extraction of relevant information from the signals collected by the antennas, which typically include relevant sky information interspersed with bursty interference and calibration data. The process of separating signals containing relevant sky information, from signals where the impairments are too high to provide useful information, can be improved, under some embodiments of the present disclosure, to reduce storage capacity requirements of the corresponding data archive facility. Some embodiments of the present disclosure recognize that similar problems may occur in other technical fields, where beamformed signals need be managed.

According to an embodiment of the present disclosure, a method for managing beamformed signals include the following operations (not necessarily in the following order): receiving beamformed signals from one or more arrays of receiving elements, which one or more arrays of receiving elements send beamformed signals at given transmission rates; recovering information from the received beamformed signals; measuring a quality of the recovered information, using a metric that estimates a distance between the recovered information and reference information; and based on the measured quality, instructing the one or more arrays of receiving elements to change the transmission rates at which they send beamformed signals.

According to an embodiment of the present disclosure, a system for managing beamformed signals includes: (i) a recovery unit, adapted for recovering information from beamformed signals received from one or more arrays of receiving elements at given transmission rates; and (ii) a processing unit adapted for: (a) measuring a quality of a recovered information, using a metric that estimates a distance between the recovered information and a reference information, and (b) instructing the one or more arrays of receiving elements to change the transmission rates at which they send beamformed signals, based on a quality of a recovered information as measured by the processing unit.

According to an embodiment of the present disclosure, a computer program product for managing beamformed signals includes a computer readable storage medium having program instructions embodied therewith, the program instructions executable by a computerized system. The program instructions are executable to cause: (i) a recovery unit of a system to recover information from beamformed signals received from one or more arrays of receiving elements at given transmission rates; and (ii) a processing unit to: (a) measure a quality of a recovered information, using a metric that estimates a distance between the recovered information and a reference information, and (b) instruct the one or more arrays of receiving elements to change the transmission rates at which they send beamformed signals, based on a quality of a recovered information as measured by the processing unit.

Systems, products and methods embodying the present invention will now be described, by way of non-limiting examples, and in reference to the accompanying drawings.

Some embodiments of the present invention recognize that if the estimation of data reliability, which provides a measure of the quality of data, takes place at an early stage of the data management method, further data processing can be avoided in case of irrelevant data, or the amount of data processing can be tailored to extract the available information with minimum effort, thus significantly reducing the computational load of the facility.

Figure 7:
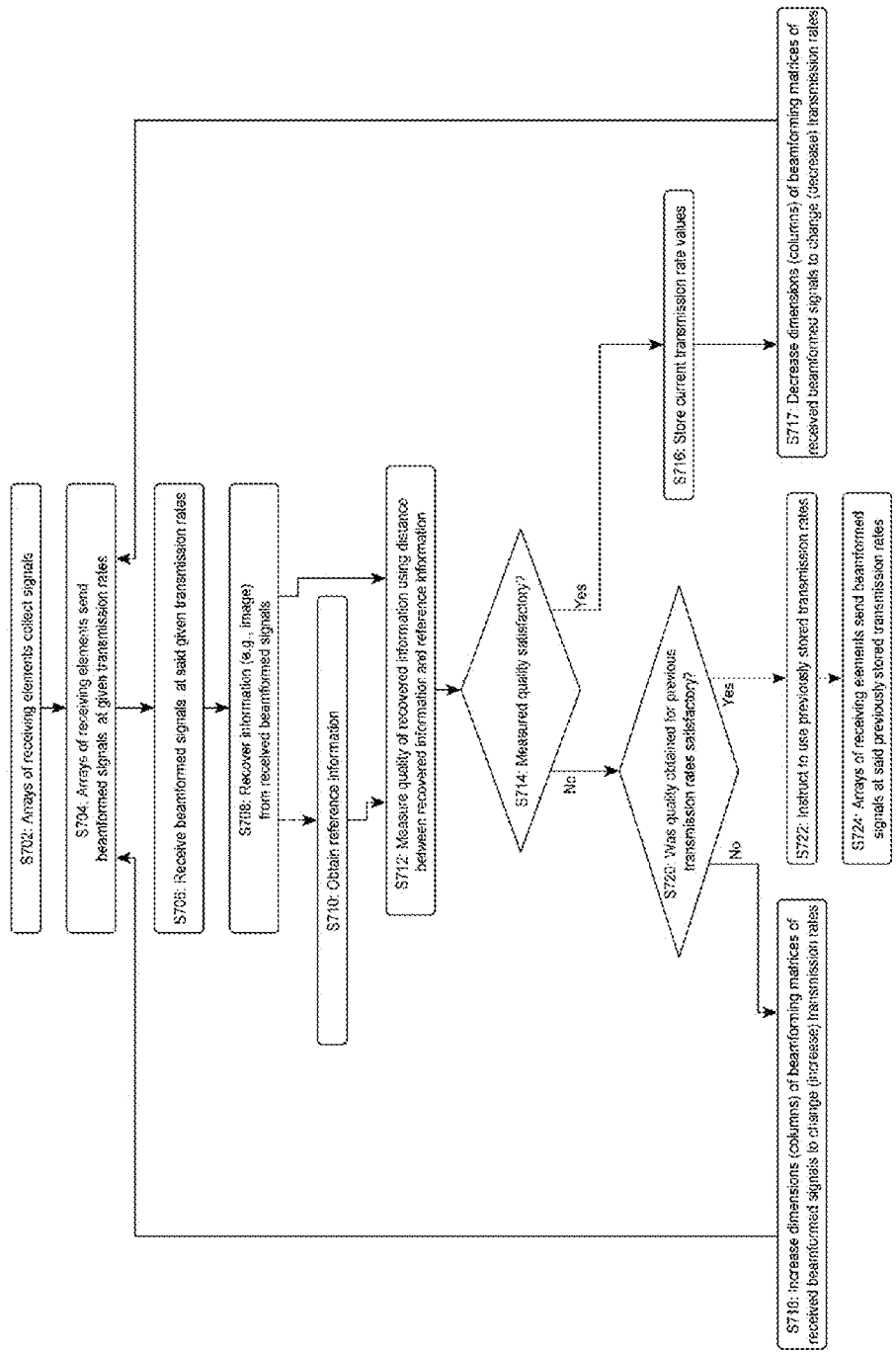
FIG. 7 illustrates a detailed sequence of method steps for managing signals received from a plurality of receiving arrays, according to embodiments.

Building on this idea, a general aspect of the invention is first described, which concerns a method for managing beamformed signals, in reference to FIGS. 1 and 7. Basically, the method starts with a step of receiving beamformed signals (at step S706) from one or more arrays 10 of receiving elements 1 at steps S702 and S704. Such arrays of receiving elements 1 send beamformed signals at given transmission rates through output unit 30 and correlation unit 40. These transmission rates will typically be non-optimal at this point. The array(s) of receiving elements may for instance correspond to an antenna station, in radio interferometry applications. It may also be a set of sensors, for example, radiofrequency coils, in the case of magnetic resonance imaging applications. Then, the method proceeds to recover (at step S708 and using recovering unit 50) information from the received beamformed signals. The information recovered is typically an image (for example, for radio interferometry or magnetic resonance imaging applications), but it may also be text, or any kind of data (cognitive, interpretable data, etc.). Various recovery methods can be contemplated, including methods known from the prior art. Still, a particularly advantageous method will be described later. Next, a quality of the recovered information is measured (at steps S710 and S712), using a metric that estimates a distance between the recovered information and reference information (see FIG. 1 at W1, W2 and W3). At steps S714, S716, S717, S718, S720, S722 and S724, based on the measured quality, the one or more arrays of receiving elements are instructed, as appropriate, by processing unit 60 and through beamforming matrix generator 20, to change the transmission rates at which they send beamformed signals.

The above method optimizes transmission rates used by the arrays, and therefore selectively reduces the amount of data transmitted and correspondingly reduces the required data storage and processing resources required. The present methods (and corresponding systems or program products) may be used in any application where beamformed signals need to be managed, especially where the transmission rates used to send the beamformed signals would benefit from optimization.

In radio interferometry applications, the receiving elements 1 are typically antennas, as depicted in FIG. 1. In such a case, the one or more arrays 10 of receiving elements correspond to one or more antenna stations, and the information recovered is typically a sky image, obtained by radio interferometry.

Figure 8:
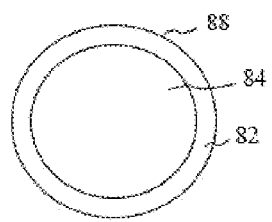
FIG. 8 shows a cross-sectional view of an insulated wire of a rung of a radiofrequency coil, which can be used as a receiver, in embodiments.

Other applications are possible. For example, the receiving elements may be radiofrequency coils 82, 84, 88 (as schematically illustrated in FIG. 8) of a magnetic resonance imaging hardware. The arrays of receiving elements may thus correspond to one or more sets of radiofrequency coils. In that case, the information recovered is a magnetic resonance image (MRI). Other embodiments may use input data generated by nuclear magnetic resonance imaging (NMRI) or, magnetic resonance tomography (MRT).

Note that the radio frequency coils 82, 84, 88 considered here are receivers, even though, sometimes, the same coils can also be used as transmitters of RF signals in MRI systems. In more detail, MRI is a medical imaging technique that allows pictures of the inside of the human body to be generated. MRI relies on creating a strong, uniform, static magnetic field. MRI systems also involve: gradient coils to produce smaller amplitude, spatially varying magnetic fields; and RF coils to create pulses of RF energy at or near the resonance frequency of hydrogen nuclei. FIG. 8 shows a cross-sectional view of an insulated wire of a rung of a typical RF coil, which is known per se. The insulated wire 88 is typically made from a wire 84 that comprises a high electrical conductivity material, for example, copper or silver, and which is individually insulated with insulation material 82.

Reverting to the present signal management methods, two classes of embodiments may be contemplated. In a first case, a known reference information is available for comparison (for example, a source of known intensity is available, for interferometry applications). In such a case, the above method proceeds by comparison of the recovered information with the known, reference information.

Some embodiments of the present disclosure can be applied even when no known reference information is available for comparison (for example, no source of known intensity is available). In such a case, one may recover information from different groups of receivers, to derive distinct information chunks and proceed to the comparison. Namely, one may identify two or more arrays of receiving elements and distinguish beamformed signals received S706 from the two or more arrays of receiving elements. Then, the information recovery consists in recovering: (i) first information from the beamformed signals received from a first group of arrays of receiving elements (just as explained above, S708), and (ii) recovering S708-S710 second information from beamformed signals received from a second group of the two or more arrays of receiving elements, where, for example, the first information may serve as the reference information (that is, the second information recovered serving as the "recovered information"). The "first" information may accordingly serve as a reference for measuring the quality of the recovered ("second") information (and conversely). Which information chunk (first or second) is measured first is not important, a priori, unless further information is available which may prompt to select the first or second information as reference information. Note that a "group" may consist of one or more arrays. One group may for instance contain only one set, or, in the contrary, all of the arrays, if necessary. Still, the two groups need be distinct, even if a partial overlap of arrays is possible.

An important aspect of the present methods is that they allow to optimize the transmission rates. In that respect, the steps of receiving, recovering, measuring and instructing to change the transmission rates may, in embodiments, be carried out so as to determine (see steps S716 to S722 of FIG. 7) transmission rates for which the measured quality has the desired quality. One would then accordingly instruct (at step S716) the one or more arrays 10 of receiving elements 1 to change the transmission rates at which they send the beamformed signals to the determined transmission rates, that is, for which the measured quality has the desired quality. The steps are typically repeated until a satisfactory quality is obtained.

To change the transmission rates, one may simply change (at S718 to S722 of FIG. 7) a dimension of the underlying beamforming matrix, that is, the matrix corresponding to the received beamformed signals (which matrix is known per se). In such a case, the set of available transmission rates is, by construction, determined by dimensions of the beamforming matrix.

In particular, one may change (at steps S718 to S722 of FIG. 7) the dimension of the beamforming matrix so as to obtain minimal transmission rates for which the measured quality still has the desired quality. Again, such steps are typically repeated until the rates are minimized, while a satisfactory quality is ensured.

Changing (at steps S718 to S722) the dimension of the beamforming matrix may include minimizing a dimension of a beamforming matrix. The dimension of a beamforming matrix determines the amount of data sent to the processing unit. Each of the receiving elements generates at least a sequence of samples, that is, numbers at a given rate—typically a predefined rate at an order of magnitude of megabits/s for interferometry applications. Assume, for example, that ten receiving elements generate, each, a sequence of samples at 1 kSamples/s. This would result in transmission rates (from each array to the central processor) of 10 kSamples/s, corresponding to a matrix size of 10×1000 for observation intervals of 1 second (s). Now, owing to beamforming, this can be drastically reduced, for example, from 10×1000 to 2×1000 for a 1 second observation interval. After multiplication of the beamforming matrix by the sample matrix $x_b^{(i)} = W^{(i)H} x^{(i)}$, see below, we obtain a new matrix $x_b^{(i)}$ and, depending on the dimension of $W^{(i)H}$, the transmission rate can be reduced. The overall transmission rate in Mbit/s is obtained by multiplying the rate of $x_b^{(i)}$ in kSamples/s by the number of bits forming one sample (and dividing the result by 1000).

Preferably, a same number of receiving elements and a same dimension of the beamforming matrix and hence a same transmission rate are used by all arrays. However, in variants, the arrays may also use different transmission rates. In the latter case, the optimization may be performed using, for example, deterministic or random approaches. For example, one may use a deterministic, for example, a round robin approach to select the arrays for optimization, that is, where the dimension of a beamforming matrix is decreased at each array, one at a time in a predetermined sequence, as long as the measured quality has, that is, equals or exceeds, a desired quality. Alternatively, beamforming matrices at the arrays may be selected randomly, one at a time, without selecting twice the same array until all arrays have been selected at least once, and the dimension of the selected beamforming matrix is decreased, as long as the measured quality equals or exceeds a desired quality. Typically, the dimension of the matrix that is increased or decreased corresponds to a number of columns of the matrix.

In a simple optimization process, the transmission rates may be increased (by increasing the corresponding matrix dimension by one) and this, as long as the desired quality is not reached. In such a case, the beamforming matrices are initially set such that a lowest transmission rate is achieved, so that a satisfactory measured quality would translate into an acceptance of the current setting of beamforming matrices.

FIG. 7 uses a somewhat more involved optimization process, wherein transmission rates are increased (but not necessarily by one, for performance reasons), and as long as the desired quality is not reached. Once the desired quality is reached (S714, "Yes"), the current setting is stored (at step S716), and the transmission rates are decreased S717 (typically here by one). On the next pass, if the quality is still satisfactory, one may again decrease the transmission rates. If not (S714, "No"), one may instruct S722 to use the last satisfactory stored setting (S720, "Yes"), for the arrays to use (at step S714) the corresponding transmission rates.

In FIG. 7, the transmission rates are increased (at step S718) subject to the double test of (see steps S714 and S720), if such tests are negative. Thus, depending on the optimization algorithm chosen, one may need to instruct (at step S722) to decrease the transmission rates at which the arrays send the beamformed signals (by correspondingly decreasing (at step S718) a dimension of the beamforming matrix).

Many other optimization algorithms can be contemplated. For example, one may increase (or decrease) the beamforming matrix using non-constant steps (for example, first increase by four, then by two, then by one). The step by which the matrix is increased or decreased may depend on the quality measured (at step S712). That is, the farther from the expected quality, the larger the step.

In more detail, the step of recovering (at step S708) information from the received beamformed signals may rely on minimizing a norm of a vector that represents information (for example, an image), subject to a constraint on a Frobenius norm (the norm of a difference between a correlation matrix of the received beamformed signals and a hypothesized correlation matrix). The hypothesized correlation matrix may for instance be derived from the one or more beamforming matrices, one or more set of receiving elements steering matrices where the steering matrices depend on the region of interest being imaged, and the vector, as used at the arrays of receiving elements, for example, the stations.

The metric used at step S712 may for instance simply be a squared norm of the error between the recovered information and the reference information, as to be discussed later in reference to FIG. 9A to D.

Figure 4:
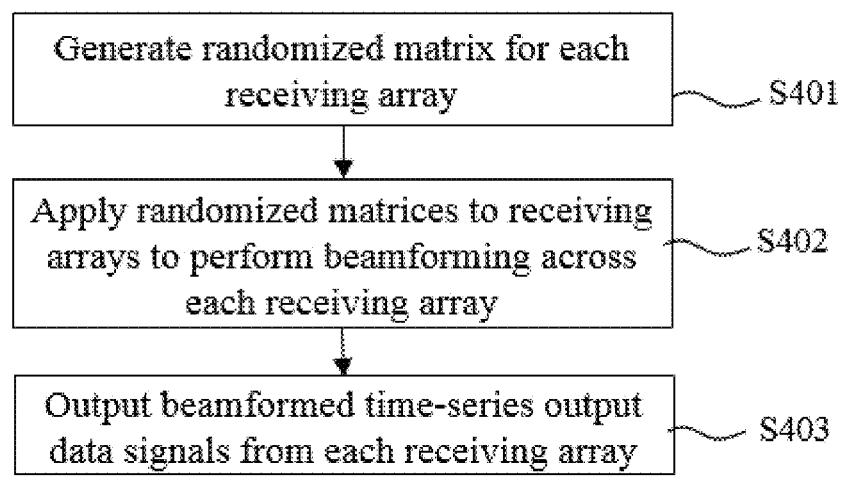
FIG. 4 shows a possible sequence of method steps for receiving signals by a plurality of receiving arrays, as involved in embodiments.

Methods for generating the beamformed signals will now discussed, in reference to FIG. 4. Such methods may rely on randomizing the beamforming matrices. Namely, and prior to receiving the beamformed signals, one may generate the beamformed signals by randomizing (at step S401) the beamforming matrices (one may generate a randomized matrix for each receiving array). Then, the beamformed signals can be obtained (at steps S402 to S403) from the randomized beamforming matrices.

In embodiments, the randomization S401 of the beamforming matrices may be carried out as follows. For a plurality L of arrays of receiving elements, each of the L arrays of receiving elements including a respective number L1, L2, ..., LL of receiving elements 1 and being adapted to generate time-series output data signals based on received signals, one generates (at step S401) a randomized matrix W1, W2, ..., WL for each of the arrays (of the plurality of L arrays). Each of the randomized matrices W1, W2, ..., WL will have a respective dimensionality M1, M2, ..., ML, wherein M1<L1, M2<L2, ..., ML<LL. Next, one applies (at step S402) each of the generated randomized matrices W1, W2, ..., WL to a corresponding array (of the plurality L of arrays) to perform beamforming across each of the arrays. Finally, the beamformed signals are obtained from the randomized beamforming matrices by outputting (at step S403) beamformed time-series output data signals from each of the arrays.

Next, according to another aspect, the invention can be embodied as a system 100 (FIG. 1) for managing beamformed signals. Consistently with the present methods, such a system includes: a recovery unit 50, which is adapted for recovering information from beamformed signals received from the arrays of receiving elements (at given transmission rates); and a processing unit 60. The latter is notably adapted for measuring the quality of recovered information (using a metric that estimates the distance between the recovered information and the reference information). The processing unit 60 is also configured to instruct the receiving arrays to change the transmission rates at which they send beamformed signals, based on the measured quality of recovered information. Of course, the processing unit 60 might decompose into several sub-units. As the earlier, an array of receiving elements may for instance correspond to a station, in radio interferometry applications. Sensors may else be used which comprise radiofrequency coils, in the case of MRI-related applications. Such a system allows to optimize the transmission rates used by the receiving arrays, and therefore to optimize the amount of information transmitted and correspondingly the required information storage and processing.

In embodiments, the recovery unit 50 may further be adapted for recovering first information (from beamformed signals received from a first group of arrays) and second information (from signals received from a second group of arrays, distinct from the first group, for the reasons explained earlier in reference to FIG. 7). The processing unit 60 may, in that case, be adapted to use the first information and the second information as reference information and recovered information, respectively, for measuring the quality of recovered information.

In embodiments, and consistently with aspects of the present methods discussed earlier, the processing unit may further be configured to perform one or more of the following operations: (i) determine transmission rates for which a quality as measured by processing unit (also sometimes herein referred to as measuring unit) 60 has a desired quality; (ii) instruct the receiving arrays to change the transmission rates accordingly; (iii) change a dimension of one or more beamforming matrix(ces) corresponding to received beamformed signals, in order to change the transmission rates at which one or more receiving arrays send beamformed signals; and (iv) determine minimal transmission rates for which the measured quality has the desired quality, among available transmission rates as determined by dimensions of corresponding beamforming matrices.

Concepts as discussed above may be combined in different ways. For instance, FIG. 1 shows a device 100 for receiving signals by a plurality of receiving arrays 10. The receiving arrays 10 include a respective number L1, L2, L3 of receiving elements 1. The receiving arrays 10 are adapted to generate time-series output data signals 2 based on received signals. The received signals can be signals being captured by the receiving arrays 10 as video and/or audio signals and can comprise graphical images, audio content or the like. The device 100 comprises a randomizing unit 20 being adapted to generate a randomized matrix W1, W2, W3 for each of the receiving arrays 10. The randomized matrices W1, W2, W3 have a respective dimensionality M1, M2, M3, wherein M1<L1, M2<L2, M3<L3. The randomizing unit 20 can periodically generate new randomized matrices W1, W2, W3. The randomized matrices W1, W2, W3 differ from each other so that a different randomized matrix W1, W2, W3 is applied to each of the receiving arrays 10.

The generated randomized matrices W1, W2, W3 are applied to the corresponding receiving array 10 to perform beamforming across each of the receiving arrays 10. Thus, an output signal vector of each array having a dimensionality L1 is reduced to a dimensionality of M1.

The device 100 further comprises an output unit 30 for outputting beamformed time-series output data signals 2 from each of the receiving arrays 10.

A correlation unit 40 then generates a correlation matrix 3 by correlating the plurality of beamformed time-series output data signals 2. The elements of the correlation matrix 3 are obtained by pairwise correlation of the beamformed time-series output data signals 2. The correlation matrix 3 is forwarded to a recovering unit 50. Note, however, that embodiments can be contemplated where no correlation occurs, that is, images may in fact be directly recovered from the beamformed time-series output data signals 2 without going through a correlation process, as done, for example, in MRI systems for point-of-care diagnostics.

The recovering unit 50 then recovers content information 4 contained in the received signal, based on the correlation matrix 3 and the randomized matrices W1, W2, W3. The recovering unit may possibly be configured to consider positions of the receiving elements when recovering the information contained in the received signals. The recovering unit may for instance use the positions of the receiving elements as well as randomized matrices for recovering the information contained in the received signals. More generally, the recovering unit may use any suitable algorithm for recovering information contained in the received signal. Such an algorithm may be based for instance on Fourier imaging.

Figure 2:
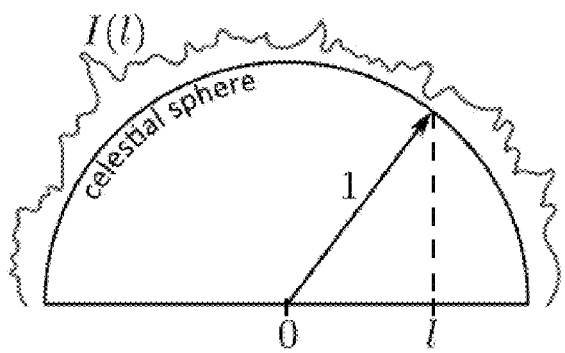
FIG. 2 shows an example of a sky image corresponding to signals managed by a device for managing beamformed signals as in FIG. 1.

As mentioned above, the content information 4 recovered can be for instance a graphical image like a sky image. This is illustrated in FIG. 2. As seen in this example, the recovered image is in the form of a celestial sphere. The signals received by the receiving elements 1 have magnitude responses represented by a function I(l) of the direction cosine 1. The function I(l) provides the intensity of the sources that are present in the field of view within the celestial sphere.

Figure 3:
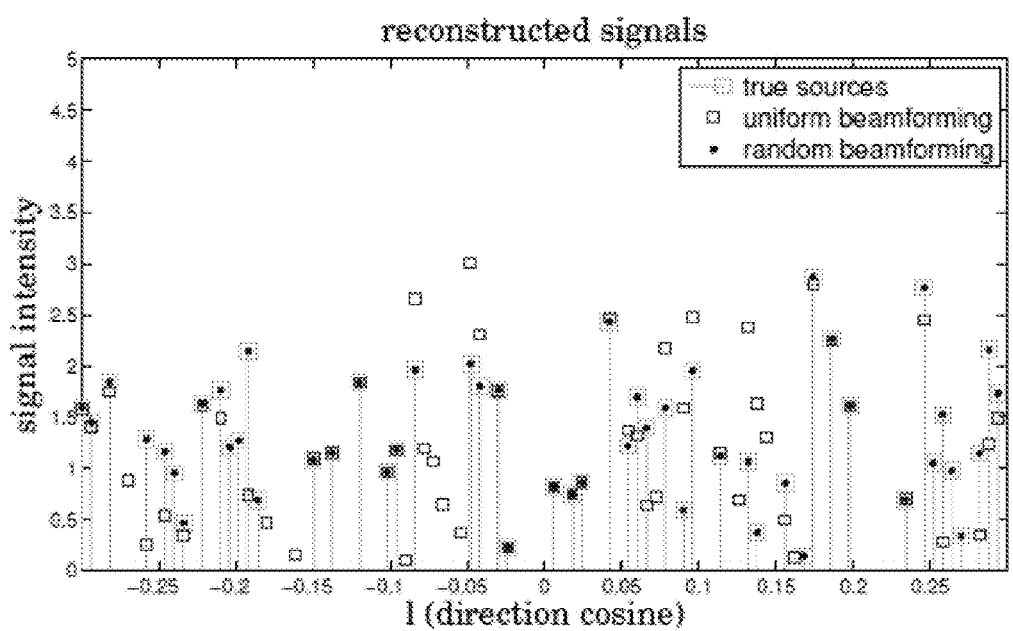
FIG. 3 is a diagram illustrating the signal intensity of reconstructed signals using different methods.

FIG. 3 illustrates a comparison between the signal intensities of reconstructed (or recovered) signals using: (i) uniform beamforming (a commonly used method, white squares with black lines); (ii) using randomized beamforming (thick black dots) as provided by the device 100; and (iii)

the signal intensities of the true sources (grey squares terminating vertical lines). As seen in FIG. 3, using randomized beamforming provides a high-quality signal recovery, in almost perfect agreement with the true sources. Thus, almost perfect recovery can be attained by using random beamforms as disclosed herein.

More generally, present inventors have observed that uniform beamforming leads to accuracy of about 40% whereas random beamforming results in accuracy close to 100%.

Referring back to FIG. 1, the system 100 further comprises a processing unit 60, which takes the content information 4 recovered as input, to measure the quality of recovered information, using an appropriate metric, as discussed earlier. The unit 60 is further able to instruct the receiving arrays to change the transmission rates at which they send beamformed signals. To that aim, the unit 60 may send new matrix dimensions to the randomizing unit 20 (or more generally a beamforming matrix generator) or, equivalently, instruct the randomizing unit 20 to change dimensions of the matrices. The randomizing unit 20 will accordingly react by sending new matrices W1-W3 to the recovering unit 50, and so on. Once the desired quality has been achieved and the transmission rates have been optimized, optimal content information 4 is recovered from the recovering unit 50, which can be passed, if necessary, to the processing unit 60. The latter may then forward optimal recovered information 5 to a requester.

Figure 5:
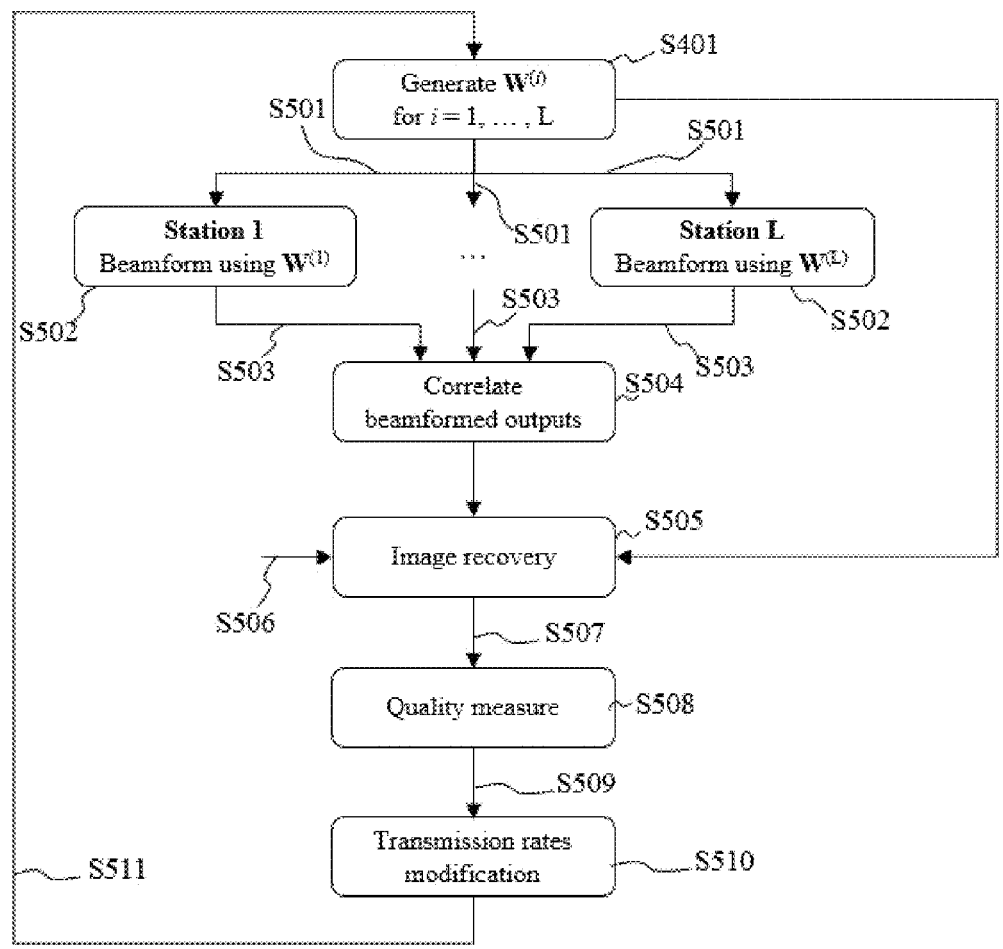
FIG. 5 represents a sequence of method steps for managing signals received from a plurality of receiving arrays, according to embodiments.

FIG. 5 shows a further embodiment of a sequence of high-level steps of a method for managing beamformed signals, according to embodiments. The first step S401 corresponds to step S401 of FIG. 4. At step S501, randomized matrices $W^{(i)}$ are forwarded to respective receiving arrays 10, here denoted as station 1 to station L. Beamforming is then carried out using the respective randomized matrices $W^{(1)}$ to $W^{(L)}$, S502. At step S503, beamformed time-series output data signals are forwarded to the correlation unit 40, for it to correlate S504 the beamformed time-series output data signals, to generate a correlation matrix. Next, image recovery S505 is carried out based on the correlation matrix received and antenna positions fed at S506 that is the positions of the receiving elements. In the example of FIG. 5, the recovered content information is a sky image, output at step S507. This output is used S508 to measure the quality of the recovered information. A result of this measure S509 is then used S510 to decide whether to modify the transmission rates. If so, a signal S511 is sent, in a feedback loop fashion, to step S401.

At present, some mathematical considerations are explained in more details, which may advantageously be used, in various embodiments of the present disclosure.

To start with, assume that random beamforming is relied upon, as discussed in reference to FIG. 1. That is, the receiving arrays 10 are adapted to generate time-series output data signals 2 based on received signals (for example, signals captured by receiving arrays 10). Randomized matrices W1, W2, W3 are generated for each of the receiving arrays 10 (they have a respective dimensionality M1, M2, M3, with M1<L1, M2<L2, M3<L3, and they preferably differ from each other). Furthermore, new randomized matrices W1, W2, W3 can periodically be generated. The underlying idea is to have different beamshapes for each of the receiving arrays and hence to code information contained in the received signals, both in the phase that is, the time delay, and the magnitude of the received signals. Received signals refer to signals being received by the receiving arrays, for example in the form of electromagnetic waves. Beyond graphical images of the sky, the received signals can be any kind of radio signal. For example, the present methods and systems can be applied to remote sensing by interferometry (generally, the receiving elements can be sensors for sensing signals, transducers or the like), to MRI, etc.

By applying random beamforming across each of the receiving arrays, present device and methods may improve the recovered information content. Randomized beamforming is used on a plurality of receiving arrays in a complementary fashion. This means that the randomization of beamforms may distinguish information captured by one of the receiving arrays, that is, one group of receiving elements, from information retrieved by another group of receiving elements. This may result in increasing the quality of the overall information and in increasing the cumulative information content acquired (for example, by an interferometer).

In typical applications as contemplated herein, receiving elements shall be grouped to form stations or arrays. Signals received by the receiving elements at the stations are beamformed and sent to a central correlator. However, beamforming is typically performed in a same way across all arrays.

The known uniform beamforming approach aims to maximize the signal-to-noise ratio (SNR). In contrast, present methods and systems preferably use different, randomized beamforming at each receiving array. By having the beamforms at the different arrays act independently, the quality of the total information content may be improved. The randomized matrices may be generated periodically in order to periodically alter the beamforms at the different receiving arrays. The different beams thus work collaboratively and both SNR and the information content of the received signals are considered in that case.

More in details, in preferred embodiments, each of the plurality L of receiving arrays includes a number of receiving elements, which may vary from array to array but may also be equal. Thus, each of the receiving arrays includes a number L1, L2, . . . , LL of receiving elements, wherein L1, L2, . . . , LL may possibly differ. For each of the L arrays, a randomized matrix is generated, the dimensionalities of each matrix being smaller than the number of receiving elements of the corresponding array.

Preferably, each of the received signals has a dimensionality L1, L2, . . . , LL and each of the beamformed time-series output data signals has a dimensionality M1, M2, . . . , ML. This corresponds to a transformation of a higher dimensionality vector to a lower dimensionality vector and is done at a plurality of time instants.

When performing beamforming across each of the receiving arrays, the randomizing unit may be adapted to combine time-series output data signals, based on signals received from each of the receiving elements and according to the corresponding randomized matrix. The beamforming is done across the receiving elements, that is, at the array level and not at the level of the receiving elements. Using different dimensionalities, the L1-dimensional vector (or L2, . . . , LL-dimensional vector) of one receiving array is reduced to an M1-dimensional vector (or M2- . . . , ML-dimensional vector) at a given time instant.

This is now described based on an example. Assume L receiving arrays, numbered 1 to L, where the i-th receiving array comprises $L^{(i)}$ receiving elements. The positions of the receiving elements of the i-th array are denoted as $p^{(i)}j$ where $j=1, \ldots, L^{(i)}$. Assume that signals received by the receiving elements are narrow-band signals centered on the frequency $f_0$, the signal $s_q$ coming from a direction pointed by unit vector $r_q$ captured by the i-th array can be written:

$$x_q^{(i)} = a^{(i)}(r_q) s_q,$$

where $a^{(i)}(r_q) \in \mathbb{C}^{L^{(i)}}$ is the array steering vector of the i-th array towards direction $r_q$ given by $$a^{(i)}(r_q) = \begin{pmatrix} e^{-j2\pi \langle p_1^{(i)}, r_q \rangle} \\ \vdots \\ e^{-j2\pi \langle p_{L_i}^{(i)}, r_q \rangle} \end{pmatrix},$$

where $\langle p, r \rangle$ denotes the inner product between vectors p and r. Assuming there are Q many point sources in the sky, by stacking the signals emitted by these sources in a length Q vector $s \in \mathbb{C}^Q$, the signal received by the i-th receiving array can be written as $$x^{(i)} = A^{(i)} s,$$

where the $q^{th}$ column of matrix $A^{(i)} \in \mathbb{C}^{L^{(i)} \times Q}$ is equal to $a^{(i)}(r_q)$.

In other words, beamforming at the i-th receiving array can be seen as transforming the $L^{(i)}$ dimensional signal $x^{(i)}$ by a linear operator, hence it can be represented as a matrix multiplication. The beamforming matrix at the i-th array can be denoted with $W^{(i)} \in \mathbb{C}^{L^{(i)} \times M^{(i)}}$, where $M^{(i)}$ is the number of beamforms used at that array. The beamformer output of the i-th array can then be written as $$x_b^{(i)} = W^{(i)H} x^{(i)}$$
$$= W^{(i)H} A^{(i)} s,$$

where $(\cdot)^H$ denotes a conjugate transpose of a vector. The correlator output that uses the beamformed signals from the L stations equals to:

$$\hat{R} = \begin{pmatrix} x_b^{(1)} \\ x_b^{(2)} \\ \vdots \\ x_b^{(L)} \end{pmatrix} (x_b^{(1)H} \ x_b^{(2)H} \ \ldots \ x_b^{(L)H})$$

$$= \begin{pmatrix} W^{(1)H} A^{(1)} \hat{\sum_s} A^{(1)H} W^{(1)} & W^{(1)H} A^{(1)} \hat{\sum_s} A^{(2)H} W^{(2)} & \ldots \\ \vdots & \ddots & \vdots \\ W^{(L)H} A^{(L)} \hat{\sum_s} A^{(1)H} W^{(1)} & \ldots & W^{(L)H} A^{(L)} \hat{\sum_s} A^{(L)H} W^{(L)} \end{pmatrix},$$

where $$\hat{\sum_s}$$

is the sample autocorrelation of the signals emitted by the sources. In the field of radio astronomy, the sources are assumed to emit uncorrelated signals, so $$\hat{\sum_s}$$

approaches a diagonal matrix as the number of samples used to calculate the correlations increases.

As seen in the equation above, each entry of the correlation matrix is a weighted combination of the elements of the individual correlation matrices between different receiving arrays. Whenever the matrix $W^{(i)} \in \mathbb{C}^{L^{(i)} \times M^{(i)}}$ has less columns than rows, that is, $M^{(i)} < L^{(i)}$, this represents a projection from a higher dimensional space to a lower dimensional space, hence information is lost if a vector carrying the desired information does not belong to the lower dimensional space. However, by selecting the projection matrices randomly, the overall information is reliably recovered from the correlation matrix $\hat{R}$ with higher probability than by uniform beamforming with the same dimensionality.

The randomizing unit may be designed to generate randomized matrices by producing random values. One possibility is to produce random values and to fill matrices with the random values. The random values can, for example, be selected arbitrarily or drawn from a probability distribution. The columns of the randomized matrices should then be normalized to have unit norm. For instance, a randomized matrix may have elements that are independent and identically distributed circularly symmetric complex Gaussian random variables. For example, each randomized matrix $W^{(i)}$, i=1, . . . , L, can be generated to have elements that are independent and identically distributed circularly symmetric complex Gaussian random variables with zero mean and unit variance.

Selecting the elements of the randomized beamforming matrices as complex Gaussian random variables leads to a straightforward computation of the statistics of the correlator output matrix. This is advantageous as Gaussian random matrices are usually assumed in optimization algorithms for later mage recovery.

As an alternative to the usage of symmetric complex Gaussian random variables, the randomized beamforming matrices $W^{(i)}$ can be generated by conjugate matched beamforming. This can be done towards randomly chosen directions within the region of interest. Region of interest in this case may denote a region of the sky from which signals should be received or captured. In conjugate matched beamforming, the received signals are multiplied by the conjugates of the weights represented by the elements of the array steering vectors and then summed, yielding optimal SNR performance.

Still, a filter may be applied to each of the randomized matrices to attenuate signals outside a region of interest. For example, after generating the beamforming matrices $W^{(i)}$ each column of the beamforming matrices can be convolved with a beam-shaping filter to attenuate signals coming from outside the region of interest. The beam-shaping filter can be fixed, or adaptive.

At present, the transmission rates' optimization is discussed in details. Assume that the goal invention is to determine a quality measure for an image ŝ, for example a sky image obtained by radio interferometry. In this case, the sky image ŝ is recovered by processing signals received by antennas grouped in several stations in geographical locations that are separated by large distances, typically tens or even hundreds of kilometers. As discussed earlier, two classes of embodiments can be distinguished. These are now discussed in the context of an application to a radio interferometry system, using random beamforming methods as discussed above.

In the first class of embodiments, it is assumed that the field of view corresponding to a sky image contains a source of known intensity, as is usually the case, to allow calibration of the array elements. The quality of the sky image is then obtained by measuring the squared error between the known intensity and the recovered intensity of the source, that is, $e^2=|\hat{s}_0-s_0|^2$, where $\hat{s}_0$ and $s_0$ denote the estimated source intensity and the known intensity at a well-defined point within the field of view, respectively. The estimate of the squared intensity error has been investigated, by simulations of a radio interferometry system using thirty antenna stations having five antennas each, and M=1, 2 or 4 beams per station. In these simulations, the field of view was bounded by the direction cosines of −0.3 and 0.3, and 20 point sources were assumed, with minimum separation between the sources equal to 0.006. A Rayleigh distribution with variance $\sqrt{(\pi/2)}$ of the source intensities was assumed, correlation of the received antenna signals was performed over 768 samples, and various values of the variance of the measurement noise were considered.

Figure 9A:
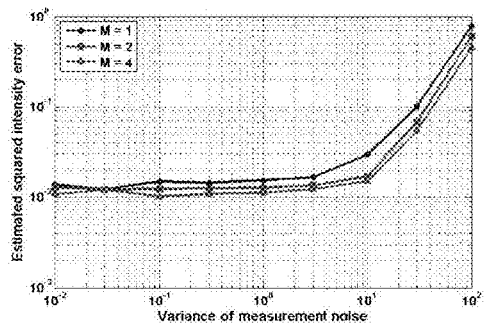
FIGS. 9A-D illustrate results obtained by simulations of a radio interferometry system.
Figure 9B:
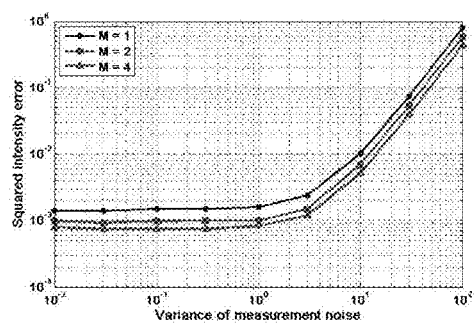
Figure 9C:
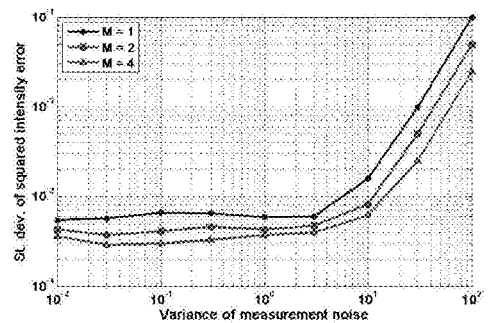

The accuracy of the method used in the first class of embodiments is illustrated in FIG. 9A, by comparison with the squared intensity error actually obtained for the assumed system, FIG. 9B. The standard deviation of the squared intensity error is depicted in FIG. 9C.

Figure 9D:
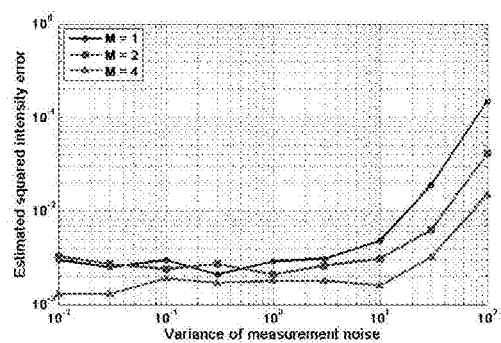

In a second class of embodiment, the assumption that the field of view corresponding to a sky image contains a source of known intensity is dropped. In this case, the quality of the sky image is obtained by measuring the squared error given by the square of the norm of the difference between the intensity recovered by different groups of antenna stations over the entire field of view, that is, $e^2=|\hat{s}_1-\hat{s}_2|^2$, where $\hat{s}^1$ and $\hat{s}_2$ denote the vectors of the recovered sky images by the first and second antenna station groups, respectively. The estimate of the squared intensity error by the second method is illustrated by FIG. 9D, showing the estimated squared intensity error obtained by simulations of a radio interferometry system using 60 antenna stations having 5 antennas each, and M=1, 2 or 4 beams per station. The field of view is bounded by the direction cosines of −0.3 and 0.3, and 20 point sources are assumed, with minimum separation between the sources equal to 0.006, a Rayleigh distribution with variance $\sqrt{(\pi/2)}$ of the source intensities, correlation of the received antenna signals performed over 768 samples, and various values of the variance of the measurement noise. The sky images $\hat{s}_1$ and $\hat{s}_2$ are obtained by resorting to two groups of 30 antenna stations each. Note that no attempt was made to optimize the parameters of the adopted sparse signal recovering algorithm yet. But improved performance may be obtained by iterative reweighting of the regularization parameter in the recovering algorithm.

To summarize advantages achieved by embodiments disclosed here: as a plurality of beamforms are used for each array, the diversity in the measurements is increased which results in improving the reconstruction fidelity. Yet, the rate of data transfer between the arrays and the processing unit can be reduced (or optimized) with respect to known beamforming methods. In other words, embodiments described herein may achieve a same or improved imaging resolution, while improving flux density recovery performance.

Computerized devices may be suitably designed for implementing embodiments of the present invention as described herein. In that respect, it may be appreciated that the methods described herein are largely non-interactive and automated. In some embodiments, the methods described herein may be implemented either in an interactive, partly-interactive or non-interactive system. The methods described herein may be implemented in software (for example, firmware), hardware, or a combination thereof. In some embodiments, the methods described herein are implemented in software, as an executable program, the latter executed by suitable digital processing devices. In further embodiments, at least one step or all steps of the methods of FIGS. 4, 5 and 7 may be implemented in software, as an executable program, the latter executed by suitable digital processing devices. More generally, embodiments of the present invention may be implemented wherein general-purpose digital computers, such as personal computers, workstations, etc., are used.

Figure 6:
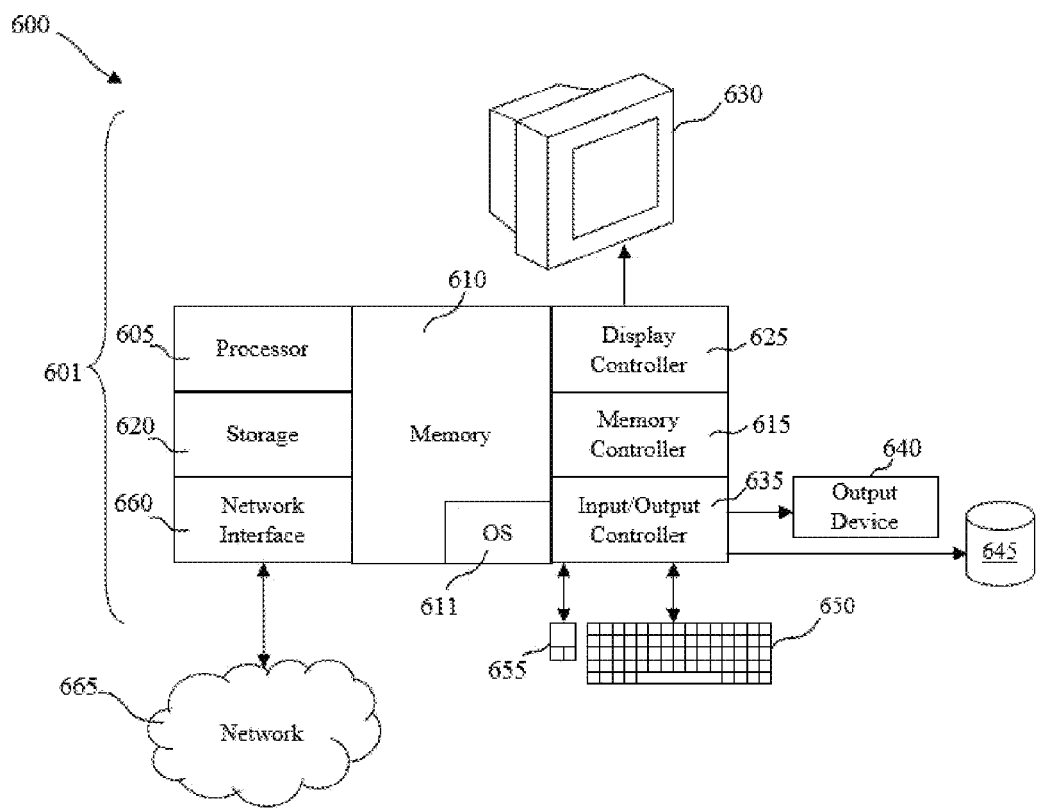
FIG. 6 shows a schematic block diagram of an embodiment of a system adapted for performing a method as in FIG. 5, according to embodiments.

For instance, system 600 depicted in FIG. 6 schematically represents a computerized unit 601, for example, a general-purpose computer. In embodiments, in terms of hardware architecture, as shown in FIG. 6, unit 601 includes processor 605, memory 610 coupled to memory controller 615, and one or more input and/or output (I/O) devices 640, 645, 650, 655 (or peripherals) that are communicatively coupled via local input/output controller 635. Further, input/output controller 635 may be, but is not limited to, one or more buses or other wired or wireless connections, as is known in the art. Input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

In this embodiment, processor 605 is a hardware device for executing software, particularly that stored in memory 610. Processor 605 may be any custom made or commercially available processor, a central processing unit (CPU), an auxiliary processor among several processors associated with computer 601, a semiconductor based microprocessor (in the form of a microchip or chip set), or generally any device for executing software instructions.

Memory 610 may include any one or combination of volatile memory elements (for example, random access memory) and nonvolatile memory elements. Moreover, memory 610 may incorporate electronic, magnetic, optical, and/or other types of storage media. Note that memory 610 may have a distributed architecture, where various components are situated remote from one another, but may be accessed by processor 605.

The software in memory 610 may include one or more separate programs, each of which comprises an ordered listing of executable instructions for implementing logical functions. In the example of FIG. 6, the software in memory 610 includes a method described herein in accordance with some embodiments and suitable operating system (OS) 611. OS 611 essentially controls the execution of other computer programs, it being noted that methods described herein (for example, FIGS. 4, 5, 7) may be partly implemented as application program, and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within memory 610, so as to operate properly in connection with OS 611. Furthermore, the methods may be written as an object oriented programming language, which has classes of data and methods, or a procedure programming language, which has routines, subroutines, and/or functions.

In this embodiment, conventional keyboard 650 and mouse 655 are coupled to input/output controller 635. Other I/O devices 640 to 655 may include sensors (especially in the case of network elements), that is, hardware devices that produce a measurable response to a change in a physical condition like temperature or pressure (physical data to be monitored). Typically, the analog signal produced by the sensors is digitized by an analog-to-digital converter and sent to controllers 635 for further processing. Sensor nodes are ideally small, consume low energy, are autonomous and operate unattended.

In addition, the I/O devices 640 to 655 may further include devices that communicate both inputs and outputs. System 600 may further include display controller 625 coupled to display 630. In some embodiments, system 600 may further include a network interface or transceiver 660 for coupling to network 665.

In this embodiment, network 665 transmits and receives data between unit 601 and external systems. Network 665 may be implemented in a wireless fashion, for example, using wireless protocols and technologies, such as WiFi, WiMax, etc. Network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

Network 665 may also be an IP-based network for communication between unit 601 and any external server, client and the like via a broadband connection. In some embodiments, network 665 may be a managed IP network administered by a service provider. Besides, the network 665 may be a packet-switched network such as a LAN, WAN, Internet network, etc.

If unit 601 is a PC, workstation, intelligent device or the like, the software in memory 610 may further include a basic input output system (BIOS). The BIOS is stored in ROM so that the BIOS may be executed when computer 601 is activated.

When unit 601 is in operation, processor 605 is configured to execute software stored within memory 610, to communicate data to and from memory 610, and to generally control operations of computer 601 pursuant to the software. The method described herein and OS 611, in whole or in part are read by processor 605, typically buffered within processor 605, and then executed. When the methods described herein (for example with reference to FIGS. 4 and 5) are implemented in software, the methods may be stored on any computer readable medium, such as storage 620, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the unit 601, partly thereon, partly on unit 601 and another unit 601, similar or not.

Aspects of the present invention are described above with reference to flowchart illustrations and/or block diagrams of methods, apparatus (systems) and computer program products according to embodiments of the invention. It will be understood that each block of the flowchart illustrations and/or block diagrams may be implemented by one or more computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved and algorithm optimization. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

The following paragraphs set forth some definitions for certain words or terms for purposes of understanding and/or interpreting this document.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for managing beamformed signals, the method comprising:
   receiving beamformed signals from one or more arrays of receiving elements, which one or more arrays of receiving elements send beamformed signals at given transmission rates;
   recovering information from the received beamformed signals;
   measuring a quality of the recovered information, using a metric that estimates a distance between the recovered information and reference information; and
   based on the measured quality, instructing the one or more arrays of receiving elements to change the transmission rates at which the one or more arrays of receiving elements send beamformed signals;
   wherein:
   the receiving, recovering, measuring and instructing to change the transmission rates are carried out so as to determine transmission rates for which the measured quality has a desired quality and instruct the one or more arrays of receiving elements to change the transmission rates at which they send beamformed signals to the determined transmission rates for which the measured quality has the desired quality; and
   determining transmission rates for which the measured quality has the desired quality comprises changing a dimension of a beamforming matrix corresponding to the received beamformed signals.

2. The method of claim 1, wherein changing the dimension of the beamforming matrix is carried out so as to obtain minimal transmission rates for which the measured quality has the desired quality.

3. The method of claim 2, wherein changing the dimension of the beamforming matrix comprises: minimizing a dimension of a beamforming matrix.

4. The method of claim 1, wherein the method further comprises: if the measured quality of recovered information exceeds a desired quality, instructing to decrease transmission rates at which the one or more arrays of receiving elements send beamformed signals.

5. The method of claim 1, wherein the method further comprises: if the measured quality of recovered information does not equal or exceed a desired quality, increasing a dimension of the beamforming matrix, to correspondingly increase transmission rates at which the one or more arrays of receiving elements send beamformed signals.

6. A method for managing beamformed signals, the method comprising:

receiving beamformed signals from one or more arrays of receiving elements, which one or more arrays of receiving elements send beamformed signals at given transmission rates;

recovering information from the received beamformed signals;

measuring a quality of the recovered information, using a metric that estimates a distance between the recovered information and reference information; and based on the measured quality, instructing the one or more arrays of receiving elements to change the transmission rates at which the one or more arrays of receiving elements send beamformed signals;

wherein recovering information from the received beamformed signals comprises minimizing a norm of a vector representing information, subject to a constraint on a Frobenius norm of a difference between a correlation matrix of the received beamformed signals and a hypothesized correlation matrix.

7. A method for managing beamformed signals, the method comprising:

receiving beamformed signals from one or more arrays of receiving elements, which one or more arrays of receiving elements send beamformed signals at given transmission rates;

recovering information from the received beamformed signals;

measuring a quality of the recovered information, using a metric that estimates a distance between the recovered information and reference information;

based on the measured quality, instructing the one or more arrays of receiving elements to change the transmission rates at which the one or more arrays of receiving elements send beamformed signals;

generating the beamformed signals by randomizing beamforming matrices; and obtaining the beamformed signals from the randomized beamforming matrices;

wherein generating the beamformed signals by randomizing beamforming matrices comprises, for a plurality L of arrays of receiving elements, each of the L arrays of receiving elements including a respective number L1, L2, . . . , LL of receiving elements and being adapted to generate time-series output data signals based on received signals, the method further comprising:

generating a randomized matrix for each of the arrays of receiving elements of the plurality of L arrays of receiving elements, each of the randomized matrices having a respective dimensionality M1, M2, . . . , ML, wherein M1<L1, M2<L2, . . . , ML<LL; and applying each of the generated randomized matrices to a corresponding array of receiving elements of the plurality L of arrays of receiving elements to perform beamforming across each of the arrays of receiving elements of the plurality L of arrays of receiving elements;

wherein obtaining the beamformed signals from the randomized beamforming matrices comprises outputting beamformed time-series output data signals from each of the arrays of receiving elements of the plurality of L arrays of receiving elements wherein L and M are integer.

8. A system for managing beamformed signals, the system comprising:

a recovery unit, adapted for recovering information from beamformed signals received from one or more arrays of receiving elements at given transmission rates; and a processing unit adapted for:

measuring a quality of a recovered information, using a metric that estimates a distance between the recovered information and a reference information, instructing the one or more arrays of receiving elements to change the transmission rates at which they send beamformed signals, based on a quality of a recovered information as measured by the processing unit, determining transmission rates for which a quality as measured by the measuring unit has a desired quality; and instruct the one or more arrays of receiving elements to change the transmission rates at which they send beamformed signals to such determined transmission rates, and changing a dimension of a beamforming matrix corresponding to received beamformed signals, in order to change the transmission rates at which the one or more arrays of receiving elements send beamformed signals.

9. The system of claim 8, wherein the processing unit is further configured to determine minimal transmission rates for which the measured quality has a desired quality, among available transmission rates as determined by dimensions of corresponding beamforming matrices.

* * * * *